Oct. 12, 1948.   H. R. MITCHELL ET AL   2,451,401

TRANSMISSION

Filed June 10, 1947   2 Sheets-Sheet 1

Inventors:
Charles M. Sobotka,
Hubert R. Mitchell
By Cushman Darby Cushman
Attorneys.

Oct. 12, 1948.  H. R. MITCHELL ET AL  2,451,401
TRANSMISSION
Filed June 10, 1947  2 Sheets-Sheet 2
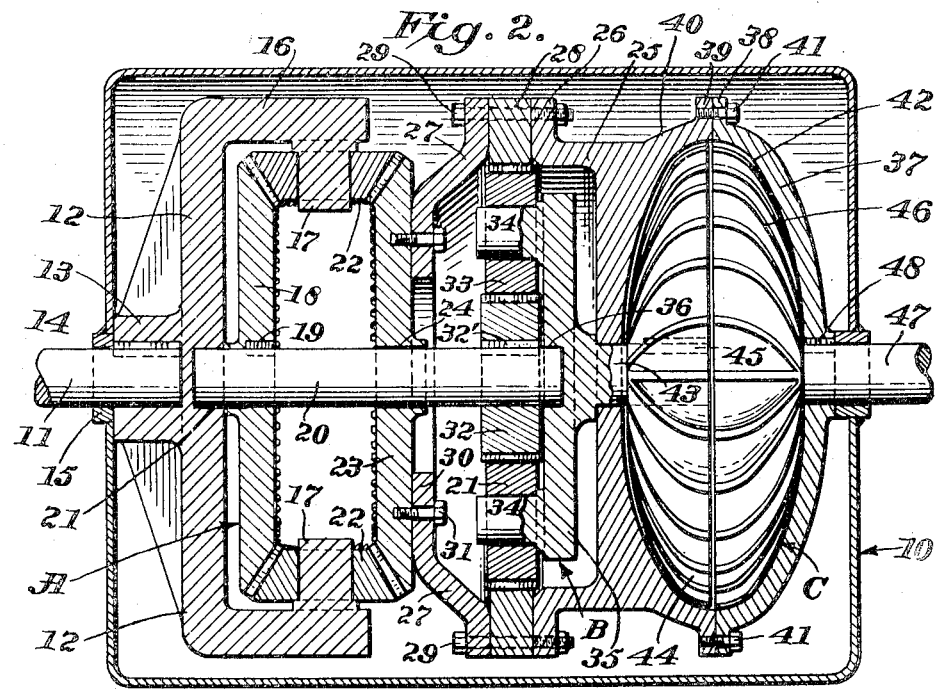
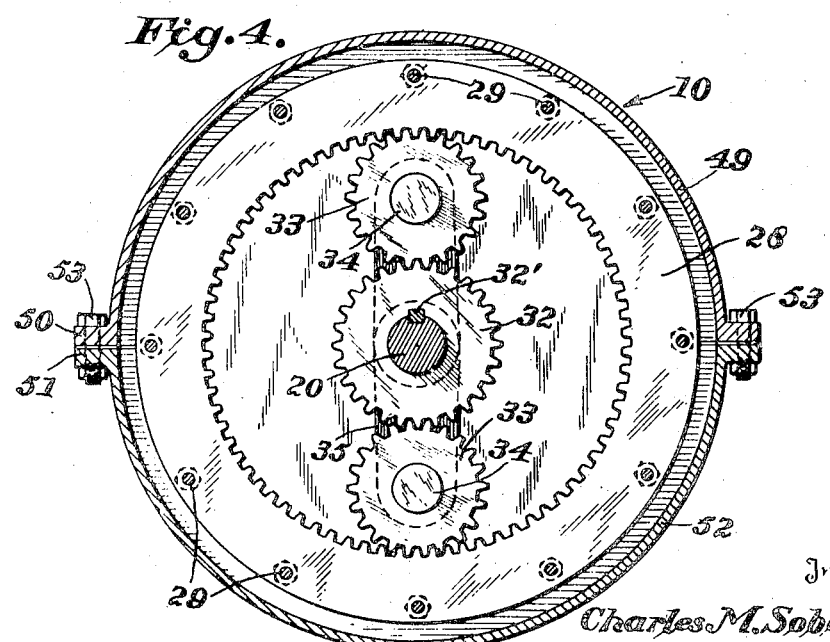

Patented Oct. 12, 1948

2,451,401

UNITED STATES PATENT OFFICE 2,451,401

TRANSMISSION

Hubert R. Mitchell and Charles M. Sobotka, Hartselle, Ala.

Application June 10, 1947, Serial No. 753,748

1 Claim. (Cl. 74—189.5)

The present invention relates to power transmission devices and more particularly to a new and improved automatic transmission unit that may efficiently and economically be used with any suitable mechanism where power is coupled to a load and the gear ratio is in proportion to the torque pull necessary to move the load.

An important object of the invention consists in providing an automatic power transmission unit including a differential gear mechanism operatively connected to the drive shaft, a fluid coupling mechanism, and a planetary gear mechanism between the differential gear mechanism and the fluid coupling mechanism. The fluid coupling mechanism includes a set of rotating vanes operatively connected to the planetary gear mechanism, and a set of relatively fixed vanes operatively connected to the driven shaft, the parts being constructed and arranged so that the operative connection of the differential gear mechanism with the drive shaft and the driven shaft functions when the starting torque is overcome to effect a direct drive between the drive shaft and the driven shaft so that they rotate at the same speed. Conversely, when an additional load is placed on the driven shaft, the differential gear mechanism operates so as to allow the drive shaft to operate at a higher speed than the driven shaft.

A further object consists in the provision of an automatic power transmission gear mechanism in which means are provided for insuring a positive displacement and which is stepless and variable so as to be applied or used in any mechanism where power is coupled to a load and the gear ratio is in proportion to the torque pull necessary to move the load. The parts are constructed so that the gears are always in mesh and means are provided for producing a cushion effect upon the application of power. Moreover, the gear ratio is arranged so as to always be in proportion to the power and the load.

Other objects and advantages of the invention will become apparent from the following description when taken in conjunction with the accompanying claim and drawings.

Referring to the drawings in which is shown a preferred embodiment of the invention:

Figure 2 is a plan sectional view of the transmission unit.

Figure 4 is a sectional view taken substantially along the line 4—4 of Figure 1.

Figure 1:
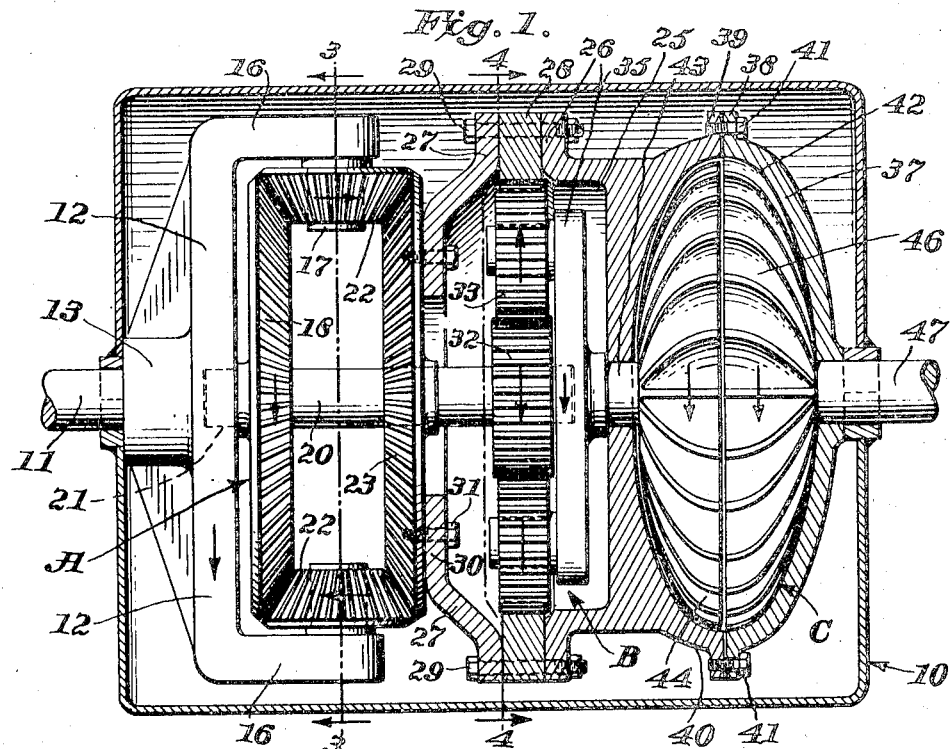
Figure 1 is a plan view with parts in section of a transmission unit constructed in accordance with the invention.

Referring to the drawings, 10 designates a housing or gear box. A drive shaft 11 extends into the gear box through one end thereof and a yoke member 12 having a central hub 13 (Fig. 2) is keyed as at 14 to the inner end of the drive shaft 11. A fixed retaining collar or bushing 15 may be provided for receiving the inner end of the drive shaft. The yoke 12 is formed with parallel arms 16 which have extending inwardly therefrom the bearing studs 17. Associated with the yoke member 12 is a differential gear mechanism designated generally by the reference A, and includes a bevel gear 18 keyed as at 19 to an intermediate shaft 20. The yoke 12 is provided with a central bearing recess 21 into which extends one end of the shaft 20 so as to be rotatably supported therein. The bevel gear 18 meshes with complementary formed pinions 22 rotatably carried by the bearing studs 17. A complementary beveled gear 23 meshes with the pinions 22 and has a central opening 24 through which loosely extends the intermediate shaft 20. Within the housing 10 and associated with the differential gear mechanism A is a planetary gear mechanism designated generally by the reference B and a fluid or hydraulic coupling mechanism designated generally by the reference C. The planetary gear mechanism B as shown, includes a case or sectional cover 25 having an annular flanged portion 26 and a complementary spaced section 27 between which is positioned an annular internal ring gear 28. These parts may be secured together by the bolts 29. The section 27 has an offset portion 30 to which is bolted as at 31 the bevel gear 23. A sun gear 32 is keyed as at 32' to the intermediate shaft 20 and meshes with planetary pinions 33 which are rotatably mounted in the bearing studs 34 on a carrier or supporting plate 35. The pinions 33 also mesh with the internal ring gear 28. The supporting plate 35 is formed with a central recess 36 which aligns with the recess 21 so as to rotatably receive the opposite end of the intermediate shaft 20 and provide a bearing support for the same.

Figure 3:
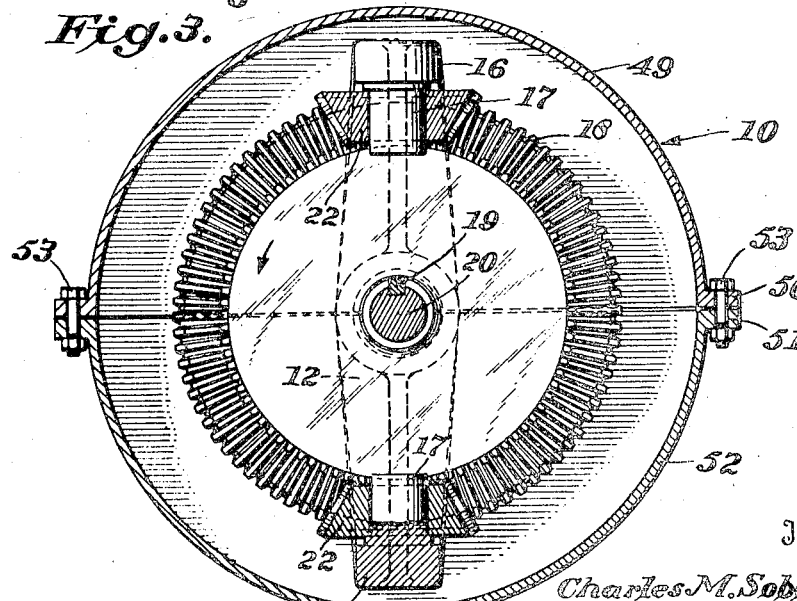
Figure 3 is a sectional view taken substantially along the line 3—3 of Figure 1.

The fluid coupling C includes a case section 37 preferably of dish-shape and having an annular flange 38 which is arranged to co-act with a complementary formed flange 39 on a portion 40 of the case 25 and be bolted thereto as at 41. The case portion 40 is also preferably of dish-shape so that when the parts are assembled a chamber 42 is formed in the fluid coupling mechanism C which is arranged to be filled with any suitable liquid. The supporting plate 35 of the planetary gear mechanism B has a centrally and outwardly disposed stub shaft 43 which extends into the chamber 42 and has keyed thereon a set of blades or vaned discs 44 as at 45 so that these vanes are rotatably mounted within the chamber 42. Co-acting with the vanes 45 are a set of similarly formed vanes 46 which are fixed or integrally connected to the inner wall of the case section 37 so as to be rotatable therewith. A driven shaft 47 is keyed as at 48 to the case section 37 and may be integral with the vanes 46. It will be seen that the case for the planetary gear system and the case for the fluid coupling mechanism are connected together to provide a unitary structure and while shown made of sections may be of one-piece if desired. Moreover, the case section 27 of the planetary gear mechanism is fixed or bolted to the bevel gear 23 so that the same will rotate with the case that constitutes the housing for the planetary gearing and the liquid coupling mechanism. The housing 10 may be of any suitable size and shape and as shown, is composed of an upper semi-circular section 49 having a flange 50 which co-acts with a complementary flange 51 on the lower semi-circular section 52 so that the sections may be detachably connected together such as by the bolts 53 (Fig. 3).

The automatic gear mechanism is arranged and constructed so as to be applied or used with any instrumentality where power is coupled to a load and the gear ratio is in proportion to the torque pull necessary to move the load. For the purpose of illustration, it may be assumed that the transmission mechanism is used in association with a motor vehicle, in which case the driven or load shaft 47 will be coupled to the rear driving shaft of the vehicle and the drive shaft 11 will be coupled to the clutch mechanism, not shown. To start the motor vehicle the clutch is released thus causing the shaft 11 to rotate in a counterclockwise direction. Since the driven shaft 47 is coupled to the rear drive shaft of the vehicle the load tends to maintain the shaft 47 stationary, due to the fact that the shaft 47 is keyed or fixed to the case 37 of the liquid coupling C and the blades 46, and as the case 37 is also connected through the case 25 and the section 27 with the bevel gear 23, these parts will also remain stationary at this time. Rotation of the drive shaft 11 simultaneously rotates the yoke 12 in the direction of the arrow (Fig. 1) which causes the pinions 23 to rotate and they rotate the bevel gear 18 in the direction of the arrow but do not disturb or rotate the bevel gear 23 which at this time is held stationary due to the load imposed on the driven shaft 47. Rotation of the bevel gear 18 turns the intermediate shaft 20 in the direction of the arrow which imparts rotation to the sun gear 32. Gear 32 simultaneously moves the pinions 33 against ring gear 28 which causes the supporting plate or member 35 to revolve in proportion to the gear ratio and in the same manner as if gear 32 were working against gear 28. Rotation of the plate member 35 revolves the stub shaft 43 and moves the blades 44 inside the liquid filled chamber 42 thus causing the liquid inside the chamber to rotate the vanes 46 and its associated connected parts including the driven shaft 47 and the case section 37, so that these parts will rotate in the same direction as the blades 44 and as indicated by the arrows in Figure 1. Rotation of the driven shaft 47 will move the motor vehicle forward at a low rate of speed and during this forward movement, the case 37, the case 25 and bevel gear 23 will be rotated in a counterclockwise direction. Bevel gear 18 rotates at a faster speed than the gear 23 until the starting torque is overcome and then due to the differential gear mechanism, the parts will operate together and at the same speed. When this occurs the power transmission operates as a direct drive between the power and the load and the shaft 11 at the same speed as the shaft 47. When additional load is applied to the driven shaft 47, the converse operation takes place, and the drive shaft 11 through the instrumentality of the differential gear mechanism will rotate faster than the driven shaft 47. It will be manifest that the housing 10 may be suitably connected to the frame of the vehicle so as to be stationarily mounted, and may be readily installed and used with any mechanism where devices of this character are employed.

It will be noted that the automatic power transmission mechanism provides a simple, efficient and economical unit in which the gears are always in mesh and which produces a cushion effect that eliminates jarring of the parts due to the sudden application of power or increase in the load. Moreover, the gear ratio is always maintained in proportion to the power and the load and is automatically variable. The transmission unit also provides a positive displacement thus preventing slipping and is stepless and may be infinitely variable.

It will be understood that the forms of the invention shown and described are merely illustrative of a preferred embodiment and that such changes may be made as come within the purview of one skilled in the art without departing from the spirit of the invention and the scope of the claim.

We claim:

A power transmission unit comprising a housing, a rotary fluid coupling case in said housing, a planetary gear case in the housing and fixed to said coupling case, a drive shaft extending at one end into said housing, a yoke member in said housing and connected to said drive shaft, said yoke member having inwardly extending bearing studs, a differential gear mechanism in said housing including an intermediate shaft, a bevel gear keyed to said intermediate shaft, pinions carried by said bearing studs and meshing with said bevel gear, a complementary bevel gear fixed to said planetary gear case and having a central opening through which extends said intermediate shaft, a planetary gear set in said planetary case including a carrier member having spaced bearing studs, said carrier member and said yoke member having aligned recesses into which extend the ends of said intermediate shaft, a sun gear keyed to said intermediate shaft, pinions carried by the bearing stud on said carrier member and meshing with said sun gear, an internal ring gear carried by the planetary case and meshing with said last mentioned pinions, said carrier member having a stub shaft extending into said fluid coupling case, vanes in said coupling case and connected to said stub shaft so as to be rotatable therewith, co-acting vanes fixed to the interior wall of said coupling case, and a driven shaft connected to the rotary coupling case and the fixed vanes.

HUBERT R. MITCHELL.
CHARLES M. SOBOTKA.

REFERENCES CITED

The following references are of record in the file of this patent:

UNITED STATES PATENTS

| Number | Name | Date |
|---|---|---|
| 1,178,837 | Bevan et al. | Apr. 11, 1916 |
| 2,026,777 | Dumble | Jan. 7, 1936 |
| 2,226,760 | Föttinger | Dec. 31, 1940 |

FOREIGN PATENTS

| Number | Country | Date |
|---|---|---|
| 372,983 | Great Britain | May 19, 1932 |
| 796,649 | France | Jan. 27, 1936 |